July 26, 1932.  J. BREZIN  1,868,656

DISPENSING DEVICE

Filed Oct. 24, 1928

WITNESS:
Rob R Kitchel.

INVENTOR
Joseph Brezin
BY
Busser T Harding
ATTORNEYS.

Patented July 26, 1932

1,868,656

UNITED STATES PATENT OFFICE

JOSEPH BREZIN, OF PHILADELPHIA, PENNSYLVANIA, ASSIGNOR TO PHILADELPHIA ICE CREAM CONE MACHINERY COMPANY, OF PHILADELPHIA, PENNSYLVANIA, A CORPORATION OF PENNSYLVANIA

DISPENSING DEVICE

Application filed October 24, 1928. Serial No. 314,564.

This invention relates to a dispensing device which is particularly adapted to fill baked ice-cream receptacles with a charge of ice-cream of substantially rectangular configuration, although it will be understood that with slight modification the preferred form below described may be arranged to dispense other shaped charges of plastic material.

It has long been customary to provide as confections baked ice-cream cones charged with ice-cream, the ice-cream remaining to a substantial degree beyond the upper extremity of the cone. Melting of the ice-cream in one of these cones permits the molten cream to flow down the outside in an objectionable manner, and recently there has come into extended use a baked receptacle of substantially rectangular configuration into which a block of ice-cream is placed without any substantial projection therefrom. Charging of these receptacles by means of a spoon, or the like, is difficult, and it is accordingly the object of the present invention to provide a dispensing means for charging one of these receptacles in a rapid and easy manner.

A further object of the invention is to provide a dispensing device of the character referred to which may be readily cleaned and which is simple in construction, so that there are no parts to get out of order.

Another object of the invention is the provision of adjustable means for limiting the inward movement of the dispensing plunger whereby a varying capacity of the device may be obtained.

This application is a continuation in part of my application Ser. No. 303,416, filed September 1, 1928.

Figure 1:
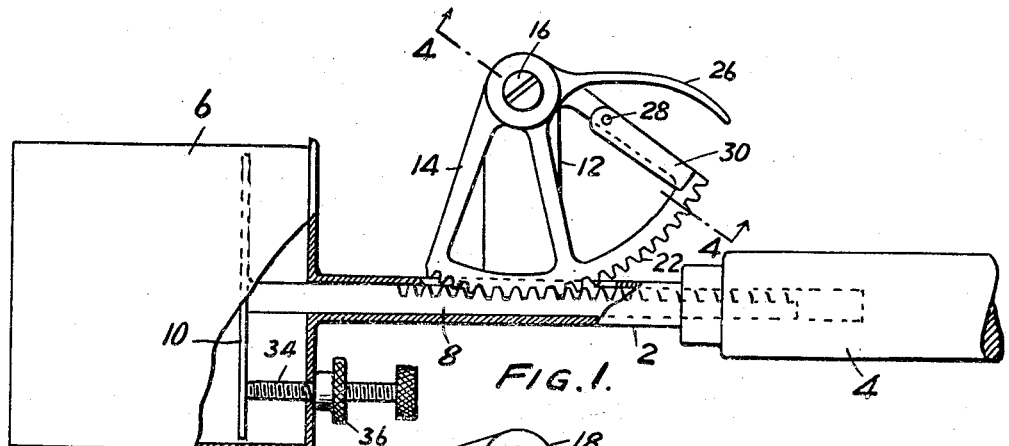
Fig. 1 is an elevation, partly in section, showing the improved dispensing device, the plunger thereof being retracted.

The dispensing device comprises a hollow, rectangular stem portion 2 suitably secured in a handle 4 which may be gripped by the user. On the opposite end of the rectangular stem 2 is secured a form 6 of substantially rectangular shape and having the end opposite the stem open. The end adjacent the stem is provided with an aperture registering with the hollow passageway within the stem. Preferably the outer edges adjacent the open end of the mould are sharpened or tapered so as to facilitate cutting of the supply of ice-cream in charging and the insertion of the dispensing device into the receptacle.

Slidably mounted within the rectangular stem 2 is a rack 8 secured to the outer end of which is a piston 10 of rectangular shape slidable within form 6. The inner portions of the side walls of the form are provided with suitable apertures 11 to permit the escape or entrance of air during the charging and discharging operations of the piston respectively.

Secured to one side of stem 2 is a bracket 12 to the outer end of which is pivotally secured a gear segment 14. Gear segment 14 is preferably mounted on a pin 16 secured in bracket 12. Adjacent the pin, segment 14 is provided with an enlarged hollow portion 18 in which is housed a spring 20 the ends of which are secured respectively to the segment and to bracket 12. This spring normally tends to move the segment in a counter-clockwise direction, as viewed in Fig. 1.

Figure 2:
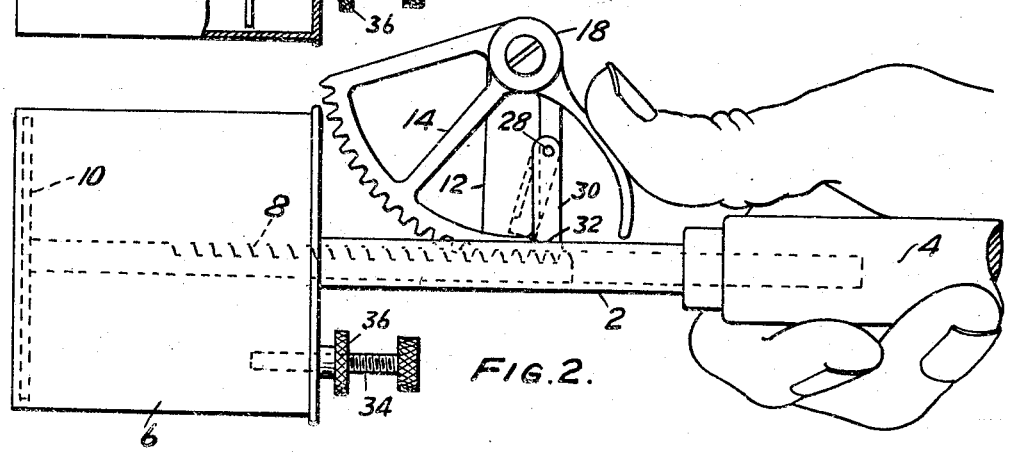
Fig. 2 is an elevation showing the dispensing device with the plunger extending forwardly in ejecting position.
Figure 3:
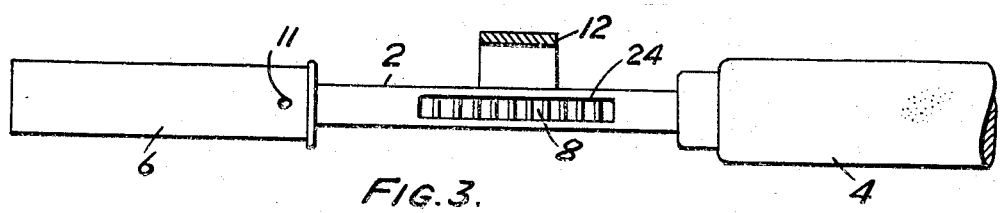
Fig. 3 is a sectional plan view of a portion of the device.

Teeth 22 of segment 14 extend downwardly through a slide 24 in the stem 2 and mesh with the teeth on rack 8. Accordingly, it will be observed that rotary motion imparted to segment 22 will, through rack 8, impart reciprocating motion to piston 10, resulting in a discharging action of the contents of the form. A thumb engaging member 26 is provided on segment 14 to permit the operator to actuate the segment against the tension of spring 20, as indicated in Fig. 2.

Figure 4:
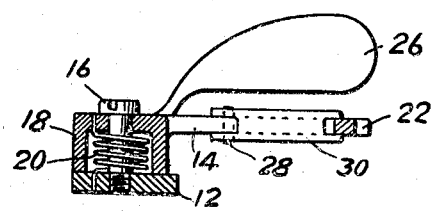
Fig. 4 is a section on line 4—4 of Fig. 1.

In order to normally limit the outward movement of piston 10 there is provided at 28 on the segment 14 a stop member 30 which is, as shown in Fig. 4, of U-shaped cross section, so as to enable it to embrace a spoke of segment 14. When this stop member 30 is in its rearward position, and segment 14 is rotated in a clockwise direction, as viewed in Fig. 2, its bottom edge 32 engages the top of stem 2, limiting the clockwise movement to prevent piston 10 from moving outside the form. If it is desired to remove piston 10 together with the rack secured thereto in order to clean the apparatus, stop member 30 may be moved in a clockwise direction to the dotted line position shown in Fig. 2, when, upon clockwise movement of segment 14, it will clear stem 2, permitting the segment to be moved to such an extent as to remove the teeth thereof from mesh with the teeth of the rack, thus permitting complete removal of the piston from the form. The piston may obviously be readily replaced, bringing the teeth of the rack into mesh with the teeth of the segment after which stop member 30 may be moved to its original motion limiting position.

The inward movement of the stop is limited by engagement of piston 10 with the end of a screw 34 threaded through the rear wall of the form and provided with a knurled head to facilitate adjustment. The stop screw is held in adjusted position by means of a lock nut 36. If it is desired to vary the dispensed charge of ice-cream by reason of a variation in size of container or for other reasons, it is most convenient to always fill the form rather than to attempt to place therein a less quantity. By adjustment of the rearward position of the piston, the capacity of the form may be varied to suit the requirements and the form may consequently always be filled to its outer edges.

It will be observed from the above that there is provided a dispensing device of simple construction which may be readily cleaned and which is very well adapted to charge rectangular receptacles of the character above described.

What I claim and desire to protect by Letters Patent is:

1. A dispensing device comprising a form having an open end, a piston for ejecting plastic material from the open end of the form, and a member operative in one position to limit ejecting movement of the piston and pivotable to an inoperative position to permit removal of the piston from the form.

2. A dispensing device comprising a form having an open end, a piston for ejecting plastic material from the open end of the form, a longitudinally movable rack connected to the piston, a toothed member for driving the rack, and a member operative in one position to limit movement of the toothed member and movable to an inoperative position to permit free movement of the toothed member whereby the piston may be removed from the form.

3. A dispensing device comprising a form having an open end, a handle secured to said form, a piston for ejecting plastic material from the open end of the form, a rack secured to the piston and mounted for sliding movement along the handle, a toothed member for driving the rack mounted on the handle for manual actuation, and stopping means comprising a member pivotally mounted on the toothed member and arranged, when in one position, to engage a portion of the handle to limit movement of the toothed member, and movable to another position to clear the handle and thereby permit free movement of the toothed member whereby the piston may be removed from the form.

4. An ice cream disher comprising a casing having one end open and having an aperture in the other end, a piston slidable into said casing from the open end thereof, a rod projecting from said piston through said aperture, a handle secured to said casing and having a guide way slidably receiving said rod so as to permit ready insertion and removal thereof, a lug on said handle, a gear, a pivot member pivotally securing said gear to said lug, teeth on said rod engaging said gear whereby to hold the rod in the guide way, said pivot member being readily removable and said rod and gear being held to said handle only by the said pivot member whereby removal of said pivot member completely dismantles the ice cream disher for cleaning.

In testimony of which invention, I have hereunto set my hand, at Philadelphia, Pennsylvania, on this 22nd day of October, 1928.

JOSEPH BREZIN.